United States Patent [19]

Wisdom et al.

[11] E Re. 29,773

[45] Reissued Sep. 19, 1978

[54] PROCESS FOR PRODUCING POTATO CHIPS

[75] Inventors: Lawrence W. Wisdom; Barney W. Hilton, both of Dallas, Tex.

[73] Assignee: Frito-Lay, Inc., Dallas, Tex.

[21] Appl. No.: 694,310

[22] Filed: Jun. 9, 1976

Related U.S. Patent Documents

Reissue of:

[64] Patent No.: 3,835,222
Issued: Sep. 10, 1974
Appl. No.: 760,736
Filed: Sep. 18, 1968

[51] Int. Cl.[2] ..... A23L 1/12

[52] U.S. Cl. ..... 426/49; 426/438; 426/808; 426/637

[58] Field of Search ..... 426/49.52, 61.62, 550, 426/637, 438–441, 808

[56] References Cited

U.S. PATENT DOCUMENTS

| | | | |
|---|---|---|---|
| 1,149,914 | 8/1915 | Haussermann | 426/637 |
| 2,274,416 | 2/1942 | Junge | 426/440 |
| 2,401,392 | 6/1946 | Ware | 426/637 |
| 3,027,258 | 3/1962 | Markakis | 426/441 |
| 3,085,020 | 4/1963 | Backinger | 426/637 |
| 3,143,424 | 8/1964 | Wilson | 426/439 |
| 3,259,503 | 7/1966 | Tan | 426/440 |
| 3,297,450 | 1/1967 | Loska | 426/550 |
| 3,361,573 | 1/1968 | Reinertsen | 426/21 |
| 3,451,822 | 6/1969 | Fast | 426/550 |

OTHER PUBLICATIONS

Woman's Day Encyclopedia of Cookery, vol. 2, Fawcett Publication, Inc., N.Y., 1966, p. 231.

Woman's Day Encyclopedia of Cookery, vol. 8, Fawcett Publication, Inc., N.Y., 1966, p. 1292.

*Primary Examiner*—Norman Yudkoff
*Attorney, Agent, or Firm*—Bernard & Brown

[57] ABSTRACT

Fried chips comprising potato solids are made by blanching pieces of raw potatoes containing in excess of 0.2 percent reducing sugar to gel starch contained therein, drying said pieces to a moisture content of about 25 to 60 percent, forming a dough comprising at least about 60 percent by weight of potato solids from said pieces, mixing said dough with yeast and allowing said mixture to ferment for a time sufficient to lower the sugar content below about [0.27] *0.2* percent by weight of original raw potatoes, forming said dough into chips, drying said chips to a moisture content of from 6–20 percent by weight and frying said chips.

20 Claims, No Drawings

PROCESS FOR PRODUCING POTATO CHIPS

Matter enclosed in heavy brackets [ ] appears in the original patent but forms no part of this reissue specification; matter printed in italics indicates the additions made by reissue.

This invention relates to a potato product, and particularly to a deep fat fried potato product, which is of a completely homogeneous nature. This invention also relates to a process for making such products.

There are a great many disadvantages inherent in the methods presently employed in the processing of potatoes in the formation of commercial products such as potato chips. Many of these problems relate to the raw potato from which the product is made.

At the present time, potatoes are commonly cured by storing at temperatures of from 50° – 75° F. for periods up to three months for the purpose of sugar removal. This requires extensive storage facilities in which the temperature and humidity must be carefully controlled. Potatoes so stored tend to sprout to a considerable extent. This sprouting results in great economic loss due to shrinkage and the necessity for removing the sprouts prior to processing.

In the production of potato chips according to conventional techniques, after the potatoes have been stored as previously described to lower the sugar level, they are peeled, sliced into chips and washed prior to frying. Considerable loss of solids occurs during the slicing and washing operation due to the extremely large surface area of the chips. Commonly, this loss amounts to about 11% of the total solids.

It is well known that natural potatoes vary greatly in their composition, such as sugar content, solids content, flavor, etc. The extent of these variations are influenced by many factors such as the type of potatoes, the season when harvested, the area where grown, their culture during the growing season, the length of time they are stored prior to use, etc. These variations result in nonuniformity of products made from the potatoes. For example, it is known that the rate of browning of a potato product during processing such as deep fat frying is influenced by the reducing sugar content of the potato. Therefore, potato chips made from one potato may be much darker in color than those made from another potato due to the difference in reducing sugar content between the different potatoes. This correlation between the reducing sugar content of a potato and the extent of browning of chips made from the potato imposes a serious limitation on the selection of potatoes which may be used in chip manufacture. It has been reported in the literature that in most instances, acceptably colored chips may be made from potatoes of less than 0.2 percent reducing sugars; but that chips made from potatoes containing more than 0.25 percent reducing sugar generally are too dark to be commercially acceptable.

Furthermore, the oil absorption rate of a potato product varies with the solids content of the potato. Generally, it has been found that for every 1 percent by weight decrease in solids content of the raw potato, the amount by weight of oil which the potato product is capable of absorbing increases by about 1½ percent. For example, when potato solids vary from 16 to 17 percent by weight, the amount of oil which the potato product will absorb will vary from approximately 40 to 38½ percent by weight. This results in potato chips made from different potatoes having markedly different oil contents due to variances in solids content of the potatoes.

Moreover, individual potatoes are not of uniform composition. For example, each potato contains a layer [,] a fraction of an inch below the surface of the potato, which completely encloses the inner portion of the potato. This layer may be higher in reducing sugar content than any of the rest of the potato and the portion of the potato which is enclosed by this layer may be of a higher reducing sugar content than the portion of the potato lying immediately below the surface. Since the rate of browning on frying varies with the reducing sugar content, each potato chip may therefore have at least three distinct areas of different degrees of browning. Moreover, bruises result in localized areas of high reducing sugar concentrations. Consequently, bruised areas will generally result in unsightly dark spots on the chips when the chips are fried. Also, the inner portion of a natural potato has a lower solids content than does the outer portion. Therefore a chip sliced from a natural raw potato will, when fried, have areas of varying oil content due to the different rates of oil absorption in the areas of varying solids content.

Attempts have been made to produce artificial potato products from potato flour, mashed potatoes containing a high per cent of gelled starch, dehydrated potatoes and other farinaceous materials high in starch content. However, none of these techniques [have] *has* achieved a proper balance of true potato flavor and texture in the resultant product which is necessary in an acceptable commercial product.

It is an object of this invention to provide potato products of a completely homogeneous nature.

It is another object of this invention to eliminate the necessity for storing raw potatoes for long periods of time prior to processing.

It is a further object of this invention to avoid the high losses of potato solids generally associated with potato chip production.

It is another object of this invention to produce high quaulity potato chips from potatoes having a high reducing sugar content.

It is still a further object of this invention to produce from fresh, raw potatoes, which may be of widely divergent compositions and characteristics, deep fat fried potato products, such as potato chips, which are of uniform color, texture, flavor, solids content and oil content.

It is yet another object of this invention to provide a means for consistently producing potato chips having the same uniform characteristics.

Another object of this invention is to produce a pellet comprising potato solids which may be made at or near the area where potatoes are grown, which may be shipped and/or stored for long periods of time and which may be fried in deep fat to produce a potato chip having good texture, flavor and color.

These, and other objects, are accomplished by the practice of this invention which, briefly, comprises drying potato pieces having a moisture content of at least 70% by weight to a moisture content of from about 25 to 60% by weight. These pieces are [than] *then* formed into a dough as by grinding, and the dough is formed into shaped bodies. The shaped bodies are dried to a moisture content of from about 6 to 20% weight to form pellets comprising potato solids. These potato pellets may be immediately fried or may be shipped and/or stored for an indefinite period in moisture tight containers.

According to the practice of this invention, potatoes of different varieties, sizes and compositions may be used as starting materials. Potatoes generally contain from about 70 to 85% by weight of moisture. The raw potatoes are peeled and blemishes are graded out. The potatoes are then sliced into potatoe pieces and washed by techniques well known to the art.

The potato pieces should be treated so as to prevent enzymatic darkening. This is preferably accomplished by blanching the pieces in hot water or with steam for a time sufficient to gel a substantial portion of the starch contained therein — e.g., at a temperature of from about 180° to 212° F. for from 1 to 10 minutes. The [potator] *potato* pieces are then removed from the blanch water and rinsed with a water spray to cool them and to remove excess free starch from the surfaces thereof.

After rinsing, the potato pieces are dried in order to reduce the moisture content thereof to from 25 to 60 percent, and, preferably from 35 to 45 percent by weight. The potato pieces may be dried at ambient temperatures, or, preferably, by heating in an oven at a temperature of from about 175° to 225° F.

The dried potato pieces are then formed into a dough. This may be accomplished by grinding them in a food grinder which is fitted with a grinding plate having hole sizes one-fourth inch or less in diameter.

If the raw potatoes which are used in the process of this invention have a reducing sugar content in excess of 0.2 percent by weight, it is preferred to treat the potatoes to lower the sugar content. This may be accomplished by adding from about 0.1 to 1.0 percent by weight of yeast, based on the total solids content, to the dried potato pieces before they are ground into a dough. The yeast may be added to the potato pieces in the form of an aqueous slurry. It is preferred that the potato pieces to which the yeast is added have a moisture content within the range of 50 to 60 percent by weight. The yeast-treated pieces are preferably formed into a dough at a temperature of from about 80° to 115° F. The dough is then allowed to ferment at a temperature of from 75° to 100° F. for from 1 to 4 hours. By controlling the reducing sugar content of the dough, the extent of browning of the final product may also be controlled. Since heat browning does not occur unless reducing sugars are present, browning may be controlled by removal of a portion of this constituent. If the reducing sugar content of the raw potatoes is below about [1.2] *0.2* percent, yeast treatment is not necessary.

Before the potato dough is formed into shaped bodies, it may be admixed with other starch containing materials such as rice flour, tapioca flour, potato starch, potato flour, wheat flour etc. It is preferred that not more than about 40 percent by weight of the total solids in the dough be other starch containing material. If other starch containing material is mixed with the potato dough, the moisture content of the resultant dough should still be between 25 to 60 percent by weight, and preferably between 35 to 45 percent by weight, before it is formed into shaped bodies.

In forming the dough into shaped bodies, it is preferred to extrude the dough into a ribbon, to air dry the ribbon in order to case harden it so that the surfaces thereof are not adherent, and then to cut the ribbon into shaped bodies. A suitable extrusion apparatus is one which is capable of generating high pressures and elevated temperatures and which exerts a high degree of shear force on the dough. It is preferred to employ an extruder fitted with a tapered auger which will raise the temperature of the dough to within the range of 175° to 215° F. when it emerges from the extrusion orifice.

The extruded ribbon, which preferably has a thickness of between about 0.015 and 0.045 inch may be cut into shaped bodies by conventional means such as with a die. While the process is being run in a continuous manner, it is preferred to recycle any excess dough from the ribbon to the extruder to be mixed with fresh dough.

The shaped bodies are then dried to a moisture content of from 6 to 20 percent, and preferably 8 to 16 percent by weight. This drying may be accomplished by placing them in a hot air oven which is heated to a temperature of from 120° to 140° F. for from 40 to 80 minutes.

The resultant dried potato pellets may be fried immediately or they may be shipped in moisture tight containers and/or stored for an indefinite period of time. Thus, the pellets may be made at or near the area where the potatoes are grown and then shipped to other parts of the country for frying. This results in considerable savings in transportation costs as compared to shipping raw potatoes since the pellets contain much less moisture than do raw potatoes.

Any conventional apparatus which is ordinarily used for deep fat frying may be employed to cook the potato products of this invention. The frying may be accomplished by means of a batch operation, in which a batch of the pellets are charged directly into the cooker, agitated and then removed; or by means of a continuous frying process, in which the pellets are fed into one end of a cooker and are continuously removed from the other end.

The type and temperature of fat or oil used to cook the chips are those conventionally used in deep fat frying potato chips. There may be used, for example, cottonseed oil, peanut oil, corn oil, soybean oil, coconut oil or mixtures thereof. The temperature in the cooker generally varies between about 345° and 395° F. Frying time may vary between 12 and 60 seconds.

During the frying operation, the pellets expand considerably, lose moisture and take up oil. The fried chips are removed from the fryer, excess oil is shaken off and the chips are then salted and packaged.

Chips made in accordance with the practice of this invention have a moisture content below about 3.5 percent by weight and an oil content of from about 30 to 36 percent by weight. The products are characterized by uniformity of color, flavor, texture, oil content, size, etc., both within each individual chip and between all of the chips. They are crisp and have an elegant flavor. Moreover, they are sufficiently rigid to withstand breakage during packaging and shipping and during use with dips.

The following examples illustrate the best modes contemplated for carrying out this invention. In these examples, all percentages are by weight unless otherwise specified.

EXAMPLE 1

Raw potatoes (100 lbs.) having a moisture content of approximately 80% and a reducing sugar content of less than 0.2% are peeled, trimmed to grade out blemishes and washed leaving about 94 lbs. of potatoes. The potatoes are then sliced into French cut shapes about 3.8 inch in thickness. These slices are blanched by contacting them with steam in a chamber maintained at atmospheric pressure for 2½ minutes. The steam in introduced to the chamber at a pressure of 15 p.s.i. and the temperature in the chamber is thereby raised to 198° F. The blanched potato slices are removed from the chamber, excess free starch is rinsed from the surfaces of the pieces and the pieces are cooled by a water spray. Excess water is drained from the potato pieces and they are then passed through a hot air drying oven. The oven is operated at a temperature of about 200° F. and an air velocity of about 200 feet per minute. The dried potato pieces have a moisture content of about 40% and weigh about 30 lbs. The dried potato pieces are ground in a meat grinder fitted with a grinding plate having orifices 1/16 inch in diameter to produce a uniformly mixed potato dough. This dough is fed into an extruder fitted with a tapered auger. In the extruder, the potato dough is subjected to a high degree of shear force. The dough emerges from the extruder at a temperature of about 200° F. in a strip or ribbon 10 inches wide and about 0.020 to 0.025 inch in thickness. The extruded ribbon, which is in a uniform, amorphous form, is then cooled and the surface is air dried to case harden and render it non-sticky. The ribbon is then cut by means of a die into pellets which are dried to a moisture content of 12% by passing them through a hot air dryer at a temperature of 130° F. for 50 minutes. The pellets are then fried by submerging them for about 13 to 15 seconds in frying oil heated to a temperature of about 370° F. During frying, the pellets expand and form chips having a crisp friable texture, a golden color and good potato chip flavor. The fried chips contain about 35% oil. The chips are then salted and packaged. About 26 to 28 lbs. of fried chips are produced from the original 100 lbs. of raw potatoes.

EXAMPLE 2

Raw potatoes (100 lbs.) having a moisture content of about 80% and a reducing sugar content of about 1.0% are peeled, trimmed and sliced as described in Example 1. They are then blanched by immersion in boiling water for 1½ minutes and washed to remove free starch. The potato pieces are then dried to a moisture content of about 52.5% and a weight of about 38 lbs. A yeast slurry is then blended with the dried potato pieces in an amount sufficient to give 0.3% of yeast based on the total solids content of the mixture. This requires 0.054 lbs. of active dry granulated yeast for the approximately 38 lbs. of dried potatoes. The yeast slurry is prepared by suspending the 0.054 lb. of active dry granulated yeast in about 6.3 lbs. of water. The potato pieces having the yeast coated on the surfaces thereof are ground in a meat grinder fitted with a grinding plate having orifices 1/16 inch in diameter and having a cooling jacket to maintain a dough temperature of 96° F. The resultant potato dough is allowed to ferment for 2½ hours in a high humidity environment at a temperature of 85° F. After fermentation, the dough is extruded into pieces ¼ inch in diameter and 1 inch long. These pieces are dried to a moisture content of 40% and are fed into an extruder, extruded into a ribbon, cut into pellets, dried and the dried pellets fried as described in Example 1. The resultant chips have good color and flavor. By contrast, chips made by conventional techniques from potatoes having the same sugar content as those used in this example have a very dark, burned appearance.

EXAMPLE 3

Example 1 is repeated except that before the 30 lbs. of dried potato pieces having a moisture content of about 40% are ground in a grinder, they are blended with 5 lbs. of rice flour (containing a moisture content of 10%) and 2.5 lbs. of water. This results in a dough comprising a solids content of 20% rice solids and 80% potato solids. The yield of dried pellets having a moisture content of 12% is about 25.5 lbs. and the yield of fried chips is between 32 to 36 lbs.

EXAMPLE 4

A fermented potato dough is prepared as described in Example 2. After fermentation, the potato dough is blended with 16 lbs. of rice flour having a moisture content of 10%. The resultant dough contains potato 30% rice solids and 70% potato solids and has a moisture content of about 40%. This dough is then extruded into a ribbon, cut into pellets, dried, and the dried pellets fried as described in Example 1. The yield of dried pellets is about 37 lbs. and the yield of fried chips is about 49 lbs.

Although the invention has been described in considerable detail with reference to certain preferred embodiments thereof, it will be understood that variations and modifications can be made without departing from the spirit and scope of the invention as described hereinabove and as defined in the claims which follow.

We claim:

1. A process for producing potato chips which comprises:

1. blanching pieces of raw potato containing in excess of 0.2 percent by weight of reducing sugar which are subject to enzymatic darkening and which have a moisture content of at least 70 percent by weight in water or steam at a temperature of from about 180° to 212° F. for a time sufficient to gelatinize starch contained therein and to prevent enzymatic darkening;
2. drying said potato pieces to a moisture content of from 25–60 percent by weight;
3. [3.] forming a dough containing yeast from said pieces, the total solids in said dough comprising at least 60 percent by weight of potato solids, and allowing said dough to ferment for a time sufficient to lower the reducing sugar content to below about 0.2 percent by weight of original raw potatoes;
4. forming said dough into chips;
5. drying said chips to a moisture content of from 6–20 percent by weight; and
6. frying said chips.

2. The process of claim 1 wherein said dough contains from about 0.1 to 1.0 percent by weight of yeast based on the total solids content.

3. The process of claim 2 wherein up to 40 percent by weight of the potato solids content of said dough is replaced with another starch containing material.

4. The process of claim 3 wherein said other starch containing material is rice flour.

5. The process of claim 2 wherein said dough is extruded into a ribbon, the surfaces of said ribbon are air dried and shaped bodies are cut from said ribbon.

6. The process of claim 2 wherein said shaped bodies are dried to a moisture content of from 8 to 16 percent by weight.

7. A process for the production of a fried potato product from potatoes containing in excess of 0.2 percent by weight of reducing sugars which comprises forming a *potato* dough comprising said potatoes, *water* and yeast, said yeast being present in an amount sufficient to ferment said reducing sugars, allowing said dough to ferment for a time sufficient to lower the reducing sugar content *to* below about 0.2 percent by weight [of] *based on* said potatoes, forming the dough into shaped bodies and frying said shaped bodies.

8. A process for producing potato chips which comprises:

1. blanching pieces of raw potatoes containing in excess of 0.2 percent by weight of reducing sugar which are subject to enzymatic darkening and which have a moisture content of at least 70 percent by weight in water or steam at a temperature of from about 180° F. to 212° F. for a time sufficient to gelatinize starch conained therein and to prevent enzymatic darkening;
2. drying said potato pieces to a moisture content of from 25–60 percent by weight;
3. forming a dough from said potato pieces, the total solids in said dough comprising at least about 60 percent by weight of potato solids;
4. mixing said dough with yeast and allowing the mixture to ferment for a time sufficent to lower the sugar content below about 0.2 percent by weight of original raw potatoes;
5. raising the temperature of said dough to within the range of 175° to 215° F. and forming said dough into chips;
6. drying said chips to a moisture content of from 6–20 percent by weight; and
7. frying said chips in deep fat.

9. The process of claim 8 wherein from about 0.1 to 1.0 percent by weight of yeast based on the total solids content is added to aid dough.

*10. A process of claim 7 in which the dough is formed into shaped bodies which are fried to provide potato chips.*

*11. A process of claim 10 in which the total solids in said dough comprises at least about 60 percent by weight of potato solids.*

*12. A process for the production of a potato product from potatoes containing in excess of 0.2 percent by weight of reducing sugars which comprises fermenting a potato dough comprising potato solids from said potatoes, water and yeast in an amount sufficient to ferment said reducing sugars, said fermenting being continued for a time sufficient to lower the reducing sugar content to below about 0.2 percent by weight based on said potatoes, and forming the dough into shaped bodies for frying.*

*13. A process of claim 12 in which the dough is formed into shaped bodies which upon frying are potato chips.*

*14. A process of claim 13 in which the total solids insaid dough comprises at least about 60 percent by weight of potato solids.*

*15. A process for the production of a fried potato product from potatoes containing in excess of 0.2 percent by weight of reducing sugars which comprises fermenting a potato dough comprising potato solids from aid potatoes, water and yeast in an amount sufficient to ferment said reducing sugars, said fermenting being continued for a time sufficient to lower the reducing sugar content to below about 0.2 percent by weight based on said potatoes, forming the dough into shaped bodies and frying said shaped bodies.*

*16. A process of claim 15 in which the dough is formed into shaped bodies which are fried to provide potato chips.*

*17. A process of claim 16 in which the total solids in said dough comprises at least about 60 percent by weight of potato solids.*

*18. A process for the production of a potato product from potatoes containing in excess of 0.2 percent by weight of reducing sugars which comprises forming a potato dough comprising potato solids from said potatoes, water and yeast in an amount sufficient to ferment said reducing sugars, fermenting said dough for a time sufficient to lower the reducing sugar content to below about 0.2 percent by weight based on said potatoes, and forming the dough into shaped bodies for frying.*

*19. A process of claim 18 in which the dough is formed into shaped bodies which upon frying are potato chips.*

*20. A process of claim 19 in which the total solids in said dough comprises at lest about 60 percent by weight of potato solids.*

* * * * *